United States Patent [19]

Lenhart

[11] Patent Number: 4,732,513
[45] Date of Patent: Mar. 22, 1988

[54] CONTROLLED SPEED COVERLESS AIR CONVEYOR

[75] Inventor: Ronald A. Lenhart, Lakewood, Colo.

[73] Assignee: Precision Metal Fabricators, Inc., Arvada, Colo.

[21] Appl. No.: 901,593

[22] Filed: Aug. 29, 1986

[51] Int. Cl.$^4$ ............................................. B65G 51/03
[52] U.S. Cl. ................................................... 406/88
[58] Field of Search ................. 406/86, 88; 198/836

[56] References Cited

U.S. PATENT DOCUMENTS

| | | | |
|---|---|---|---|
| 2,805,898 | 9/1957 | Willis, Jr. | 406/88 |
| 3,210,124 | 10/1965 | Niemi et al. | 406/88 |
| 4,456,406 | 6/1984 | Lenhart | 406/88 |
| 4,561,806 | 12/1985 | Lenhart | 406/88 |

FOREIGN PATENT DOCUMENTS 2112340 7/1983 United Kingdom .................. 406/88

Primary Examiner—Joseph F. Peters, Jr.
Assistant Examiner—James M. Kannofsky
Attorney, Agent, or Firm—Fields, Lewis, Pittenger & Rost

[57] ABSTRACT

A coverless air conveyor is provided for use with containers of varying heights. The conveyor has a jet board whose jets are substantially vertical with a slight downstream tilt and has sidewalls which form air dams to create a flowing body of air which envelopes and lifts the respective containers and moves them at a very precise speed, the speed being controlled by the small downstream vector of the air along the sidewalls of the containers. In one embodiment the sidewalls are tilted inwardly from bottom to top and air is provided in sufficient volume to vertically stabilize the containers as they move along the conveyor.

9 Claims, 12 Drawing Figures

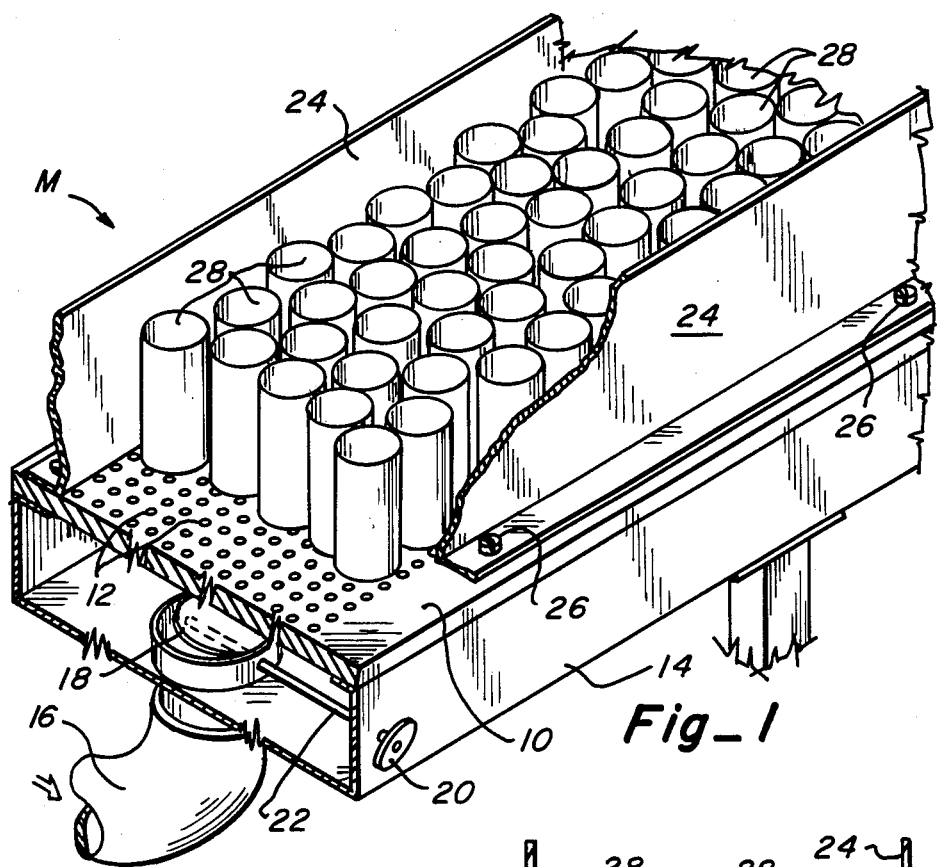
Fig_1
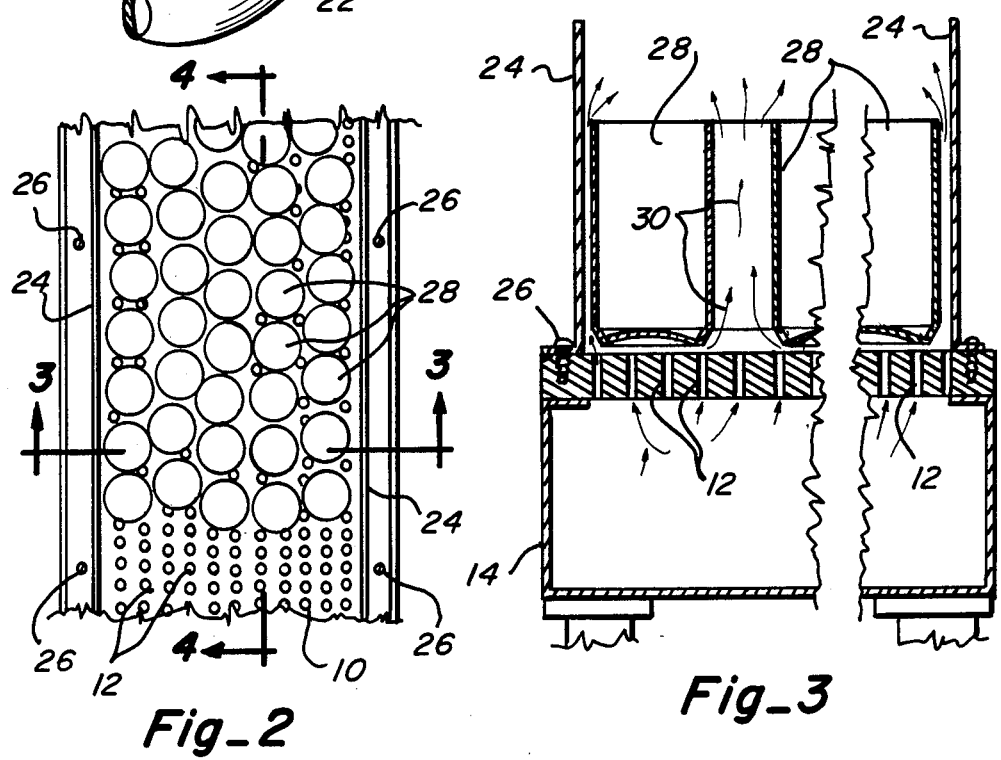
Fig_2
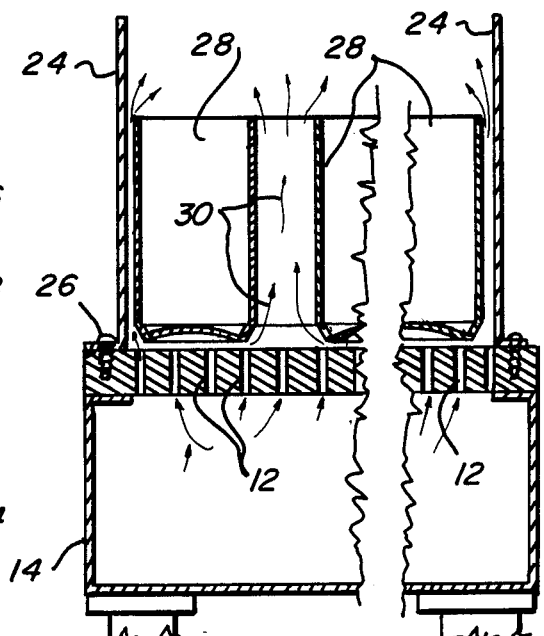
Fig_3

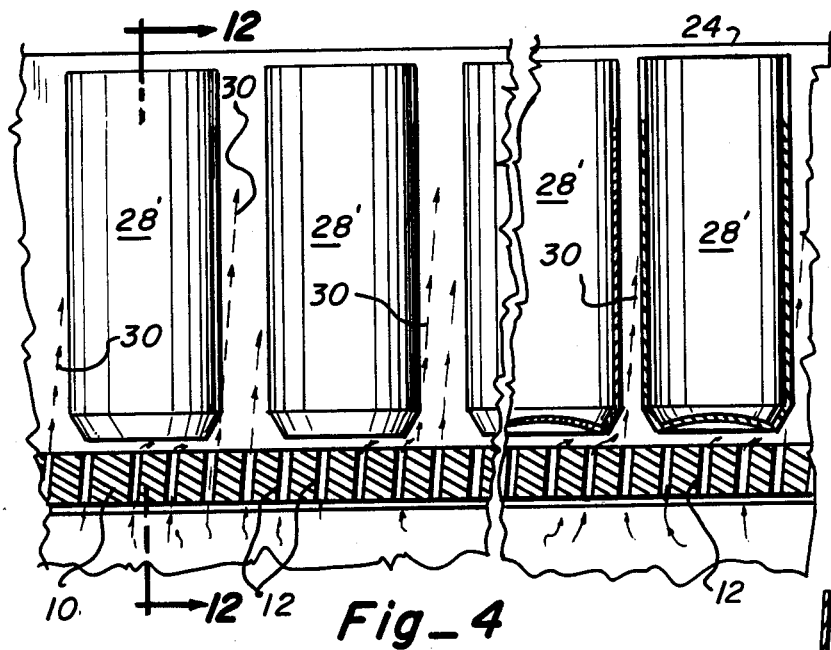
Fig_4
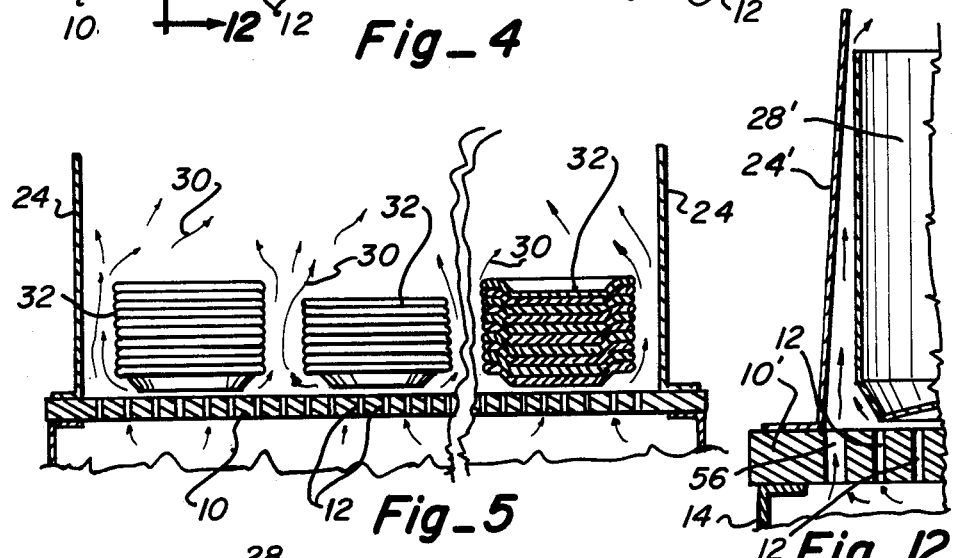
Fig_5
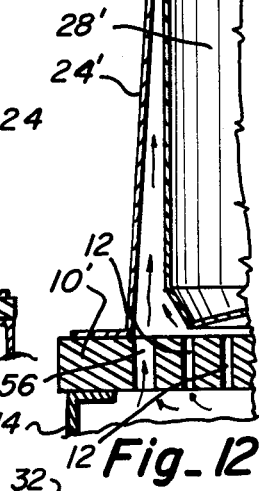
Fig_12
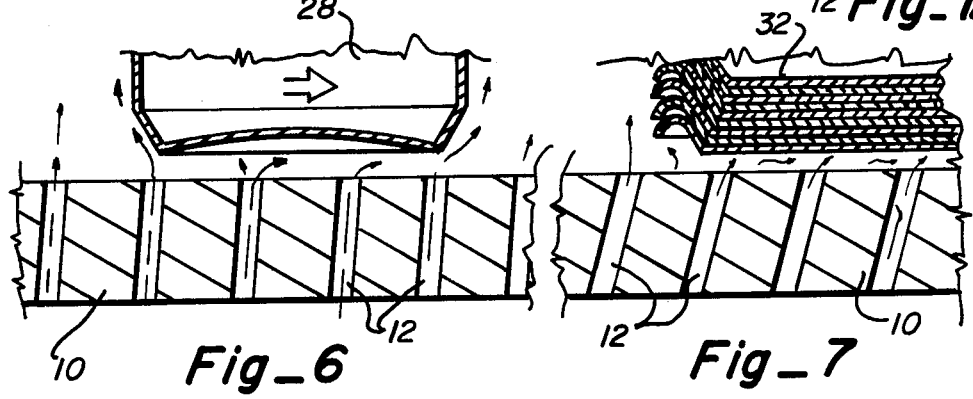
Fig_6
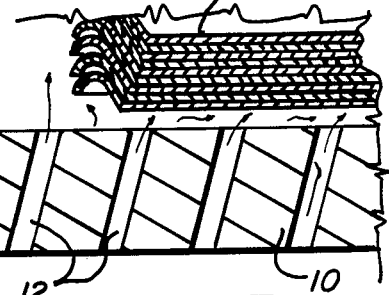
Fig_7

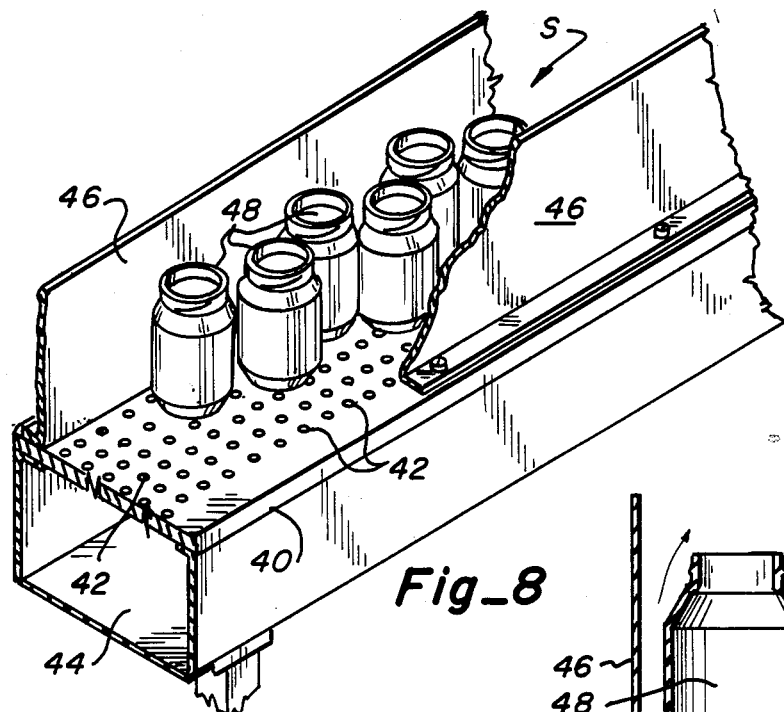
Fig_8
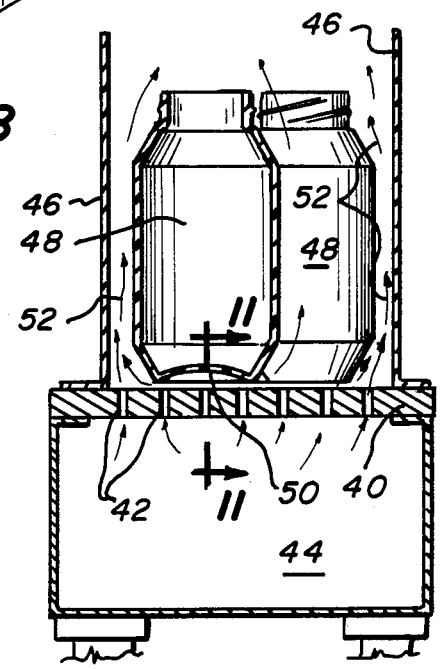
Fig_10
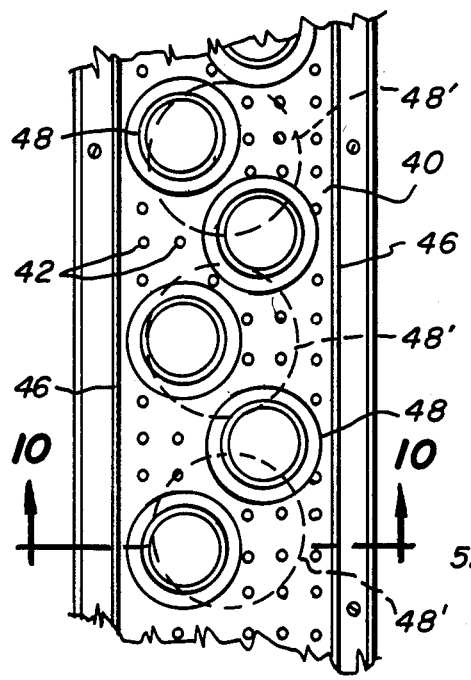
Fig_9
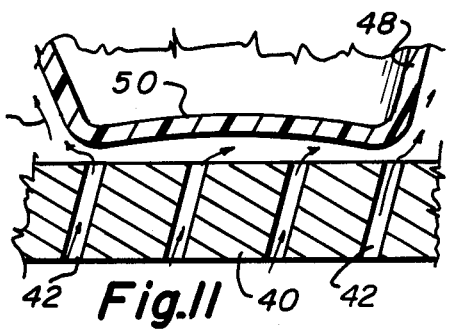
Fig.11

CONTROLLED SPEED COVERLESS AIR CONVEYOR

TECHNICAL FIELD

This invention relates to air conveying apparatus for use with generally cylindrical articles and more particularly to a controlled speed coverless air conveyor wherein the articles are enveloped in a moving mass or stream of air which acts uniformly along the sidewalls of the articles so that undesired tipping is minimized.

BACKGROUND ART

A mass air conveying system is disclosed in my U.S. Pat. No. 4,456,406. In this apparatus, air is supplied by a plenum through a jet board forming the top surface of the conveyor. The sidewalls of the conveyor can be either open or closed, and a cover is provided having widely spaced apertures to form high pressure areas therebetween to create air barriers for the containers to maintain them in a loose separated condition as they move through the conveyor. In addition, the top cover prevents the containers from tipping over.

My U.S. Pat. No. 4,561,806 is directed to a vertical single filer conveyor system which also supplies air to the surface through a jet board by means of a plenum thereunder. The single filer has converging closed sidewalls and a top cover with widely spaced apertures for the same purpose as described above. Acceleration jets are also provided for increasing the speed of the containers as they are brought into single file.

Air conveyors and air single filers have substantial advantages over mechanical conveyors and single filers in that much higher speed of handling of the containers is possible. However, one of the disadvantages is that in order to create the high pressure within the conveyor or single filer it is necessary to have a top cover which is located just above the top of the containers so that they will not tip over and to create sufficiently high air pressure to cause proper separation of the articles. Because of this, each system is set up to handle containers of a particular height. When it is necessary to use the system with containers of a different height, the cover on the table must be either raised or lowered. This results in substantial downtime and, of course, increases labor costs. Furthermore, if containers jam or otherwise become improperly aligned within the prior art systems, it is necessary to remove the top cover in order to reach them to remove them or correct their alignment.

DISCLOSURE OF THE INVENTION

In accordance with this invention a controlled speed coverless air conveyor for conveying en masse articles having widely varying diameters and heights, in constant speed, is provided. It includes a surface extending from an upstream location to a downstream location for moving the articles en masse, first and second opposite side edges and an underside with a prearranged pattern of nearly vertical flotation jets with a slight downstream vector communicating the surface and the underside. A plenum is connectable to a source of air under pressure and attached to the underside of the conveyor. A sidewall along each of the side edges has a height of at least as high as the tallest article to be conveyed on the conveyor to form an air dam so that substantially uniform high air pressure is formed throughout the conveyor.

Thus, this invention contemplates a method wherein a high pressure volume of air is created above the surface of the conveyor for at least the height of the articles being conveyed wherein the air acts uniformly on the exterior surfaces of the articles and the pressure is sufficient to maintain the articles in separated loose pack configuration. The air moves as a uniform mass or stream from the upstream location to the downstream locations so that the articles within the mass of air move in substantial uniformity with the mass. Said another way, this creates a rising column of air which envelopes the articles so that they are fluidized or suspended by the air and move uniformly with the mass air movement.

With the present invention, it can be seen that the articles are handled more gently so that the opportunity for damage to them is minimized. In addition, by providing sidewalls which are as high as the highest article to be used in the conveyor, articles of various shorter heights can be run through the same conveyor system without having to raise or lower the top covers. Furthermore, since no top covers are used on the apparatus of this invention, if the containers should inadvertently become jammed or tip over, it is easy for an operator to reach in to the conveyor and correct the problem. Additional advantages of this invention will become apparent from the description which follows, taken in conjunction with the accompanying drawings.

BRIEF DESCRIPTION OF THE DRAWINGS

FIG. 1 is a fragmentary, perspective view of an air mass conveyor constructed in accordance with this invention, with parts broken away for clarity of illustration;

FIG. 2 is a top plan view of the apparatus of FIG. 1, on a reduced scale, showing the containers in a loose configuration as they are conveyed;

FIG. 3 is a fragmentary horizontal section, taken along line 3—3 of FIG. 2, showing the flow of air around containers of a particular height;

FIG. 4 is a longitudinal section, taken along line 4—4 of FIG. 2, showing the flow of air around the containers;

FIG. 5 is a horizontal section, similar to FIG. 3, but showing the use of the invention with stacks of lids;

FIG. 6 is an enlarged fragmentary horizontal section through the jet board showing the flow of air around a container using a very shallow jet angle;

FIG. 7 is a view similar to FIG. 6, but showing a jet board having a slightly steeper angle for use with heavier articles;

FIG. 8 is a fragmentary, perspective view of a single file conveyor constructed in accordance with this invention, parts being broken away for clarity of illustration;

FIG. 9 is a top plan view of the single filer of FIG. 8 showing the uniform separation of the articles;

FIG. 10 is a horizontal section, taken along line 10—10 of FIG. 9, showing the flow of air around the articles;

FIG. 11 is an enlarged fragmentary horizontal section through the jet board showing the flow of air at the bottom of the container; and FIG. 12 is a vertical section, taken along line 12—12 of FIG. 4, showing a coverless conveyor with sidewalls tilted inwardly for increased container stability.

BEST MODE FOR CARRYING OUT THE INVENTION

In accordance with this invention, a mass air conveyor is provided, as shown in FIG. 1 having a conveyor surface 10 in the form of a jet board having a plurality of openings 12 formed therein, as by drilling. Air is supplied to the air jets by means of a plenum 14 mounted below the conveyor surface 10. Air is supplied through the plenum, as through an inlet 16, and is controlled by a damper 18 connected to a control knob 20 on the outside of the plenum by a control rod 22. Sidewalls 24 are provided along opposite sides of the jet board 10 and attached thereto, as by screws 26 or other fastening means. As will be described below, with the shallow angle of the air jets 12 and the provision of air dams 24, the containers 28 will be supported and enveloped by a large air mass. As this mass moves, it contacts the sidewalls of the containers uniformly and moves them downstream in a very precisely controlled manner without tipping.

Thus, the containers are suspended in the fluid medium, such as air, and move with it in much the same way as leaves float down a stream. Thus, the containers taken on or assume a loose configuration with respect to each other, as best seen in FIG. 2, as the air flows up around all sides of the containers as seen in FIGS. 3 and 4. The angle of air jets 12 in the downstream direction is on the order of between 15 minutes and 5°. As best seen in FIG. 4 with this shallow angle of the jets, the air moves up along the surface of the containers as shown by arrows 30. The air also moves up around the containers as shown by arrows 30 in FIG. 3. However, the air moving up along the forward sidewall surface of the can will create a slight partial vacuum along that surface, whereas the air moving up along the back sidewall will exert a positive pressure force thereon. In other words, a large volume of CFM will move up through the jet board in a substantially vertical direction which will suspend and carry the containers with it in accordance with the downstream vector of the angle of the jet board. This structure is to be carefully distinguished from that of the prior art where the jet angles are substantially steep, such as 20° to 60° whereby the air impinges on the bottom of the containers and it is the force on the bottom of the containers which causes the containers to move. However, with the present arrangement, the force is distributed substantially uniformly along the entire sidewall surfaces of the containers. The great advantage of this is that the containers are more gently handled and the speed can be very precisely controlled by merely increasing the volume of flow of air which will thereby change the speed. Furthermore, very tall containers or those that are top heavy will not be as likely to tip over since the moving or driving force on them is all along tne sidewalls rather only on the bottom.

As best seen in FIG. 5, the invention can be used to convey articles other than containers. In FIG. 5, stacks of metal container ends 32 as used on cardboard cans, of the type used for frozen fruit juice can be conveyed. The problem encountered in conveying these previously was that when a large angle was used on the jets, the stream of air was of such velocity that it would sometimes peel the top container lid off of the stack. This would be particularly true in short stacks.

The difference in suitable jet angles for different items can best be seen by a comparison of FIGS. 6 and 7. FIG. 6 shows a very shallow jet board angle, such as 3°, for conveying lightweight articles, such as aluminum containers 28 used in the beverage industry. On the other hand, when stacks of container ends 32 are transported as shown in FIG. 7, the angle of the jets 12 must be steeper, such as on the order of 5° and the velocity of the air must be higher in order to lift and support the heavier weight of the stack of container ends, as compared to the weight of beverage containers, and to provide sufficient air velocity, flow and movement to move the stacks in a downstream direction.

As seen in FIGS. 8-11, the invention also has application for moving containers of various heights and diameters in single file. A single file coverless conveyor S has a conveyor surface or jet board 40 of substantially narrower width than conveyor surface 10 of FIG. 1. This jet board 40 has a plurality of openings or jets 42 formed therein to communicate a plenum 44 mounted below the jet board 40 with the top surface of the jet board. Sidewalls 46 are provided on each side of the upper surface of jet board 40 and serve as air dams to confine the air issuing from the jets 42.

This apparatus has utility with containers of different diameters and heights. The spacing of the sidewalls 46 is such that the smallest diameter containers, such as containers 48, when brought into contiguous relationship remain in a isosceles triangular configuration so that jamming cannot occur. Because of the Bernoulli Principle the pressure is less at the center of the jet board than at the side edges, and the flow of air is faster. Therefore, the containers will tend to be pulled into single file aligned with the center line of the jet board 40. Of course, containers of larger diameter, such as containers 48', shown in dotted lines, can be used in this device and can be of a diameter up to that which is slightly less than the spacing of the sidewalls 46. The height of the containers can vary, but it is desirable that the sidewalls be at least as high as the tallest article to be conveyed, so that the air is confined and moves much in the same manner as the movement of a stream or river thereby acting on all surfaces of the container so that the forces are applied to the sidewalls of the container for carrying them downstream rather than just being applied to the bottoms thereof.

The containers 48 are shown as being of the type which has a smaller diameter bottom 50 than the diameter of the sidewalls thereof, such as plastic jars. Containers of this type are quite top heavy and can easily be tipped over if the forces applied thereto are not uniform. With conventional air conveying equipment, it is necessary to use top covers to keep the containers upright, and in some instances to provide air jets through a plenum over the containers so that air is applied equally to the bottom surface of the container and the upper surface for keeping it upright. However, with the present invention, because of the large CFM that flows around the containers thereby exerting forces all along the sidewalls of the containers they are maintained in an upright condition and the presence of a cover is not required. This unique characteristic occurs because of the high sidewalls which form air dams to confine and direct the air uniformly along a path over the surface of jet board 40 and the shallow jet angle which creates a very small downstream vector. The air flow flows up around the containers as illustrated by arrows 52.

By way of example, the apparatus of the present invention has been found satisfactory for mass conveying of jars, having the shape shown in FIGS. 8-11, using jet openings of 5/64" at a 3° downstream angle and a static pressure of 1.2". The jars weigh 58 grams, have a base diameter of approximately 3½" and a height of 7". The sidewalls are at least 7" high.

An alternative embodiment of the invention is illustrated in FIG. 12 wherein a conveyor jet board surface 10' has inwardly tilted sidewalls, such as sidewall 24'. Air is supplied to the jet board by plenum 14 through jets 12 which may be on the order of 5/64" in diameter. An additional row of larger jet openings 56 are provided just inwardly of the bottom edge of sidewall 24'. These may be on the order of 3/16" in diameter. With this arrangement, a large volume of air can be provided at the lower portion of the sidewall which minimizes the tendency for the bottom of container 28' to move against the bottom of the sidewall, and therefore remain upright. Furthermore, because of the wider spacing between the sidewall of container 28 and the bottom portion of sidewall 24' of the conveyor, there will be no sidewall attachment due to the air flow and therefore no tendency to draw the bottom of the container against the sidewall. A sidewall angle of 3° or more has been found to be satisfactory for this purpose.

Conversely, at the upper edge of sidewall 24' it will come in close proximity with the upper portion of the sidewall of container 28'. This will create the sidewall attachment or Coanda Effect wherein the top of the container sidewall will tend to be pulled against the top of the sidewall 24' of the conveyor. This will help maintain the upper end of the container in fixed upright condition and minimize wobbling. This is particularly advantageous with containers that are very tall or are top heavy.

In summary, by tilting the sidewalls of the conveyor inwardly slightly, such as 3° or more, and providing larger jet openings adjacent the wall, increased air flow can be provided adjacent the lower sidewall portion of the container which will minimize the tendency for the container to move against the sidewall of the conveyor and the greater spacing between the sidewalls of the container and the conveyor will prevent any sidewall attachment effect. On the other hand, the sidewall attachment effect will be enhanced at the upper sidewall portion of the container due to its proximity to the inwardly tilted sidewall of the conveyor to help hold the upper end of the container adjacent the sidewall and stabilize it so that it will not easily tip over.

From the foregoing, the advantages of this invention are readily apparent. A coverless air conveyor has been provided for conveying containers of varying height and size at very precise speeds. By providing a very shallow angle on the air jets, i.e., between 15 minutes and 5°, in combination to sidewalls which are at least as high as the highest article being conveyed, a stream or river of air is created above the conveyor surface which envelopes each of the containers and exerts a force on the sidewalls, as well as the bottom wall to carry them uniformly from an upstream location to a downstream location. When the angle is very shallow, lightweight articles can be lifted and conveyed. With heavier articles, the angle must be slightly greater, and the pressure in the plenum must be increased. This will cause greater air flow through the jets and provide greater CFM to lift and convey the articles. By tilting the sidewalls inwardly, as shown in the embodiment of FIG. 12, greater stability of the container is possible because of the greater volume of air at the bottom of the container to hold it away from the sidewall and the sidewall attachment or Coanda Effect at the upper portion of the sidewall tending to hold it against the sidewall and to improve stability.

Although the invention has been described for specific use with beverage containers, container ends and plastic jars, it would be understood that the device could be used for moving square or rectangular articles which are arranged in rows, as well as oblong articles and articles of most any size or shape.

With the present invention, the absence of a top cover allows the operator to have access to the articles being conveyed in addition to the advantage of handling articles of varying height. Also, the invention can be used with top heavy articles, i.e., such as jars having a small diameter base, and will maintain them in an upright condition, even in the absence of a top cover. As explained above, this is true because the air envelopes the articles and acts on the sidewalls in a uniform manner so that they are not tilted to any great extent of their vertical axis.

This invention has been described in detail with reference to particular embodiments thereof, but it will be understood that various other modifications can be effected within the spirit and scope of this invention.

I claim:

1. A controlled speed coverless air conveyor for conveying en masse articles having widely varying diameters and heights, at constant speed, said conveyor comprising:
   a surface extending from an upstream location to a downstream location for moving the article en masse, first and second opposite side edges and an underside with a prearranged pattern of nearly vertical flotation air jets with a very slight downstream vector communicating said surface and said underside;
   a plenum connectable to a source of air under pressure and attached to said underside of said conveyor; and
   a sidewall along each of said side edges having a height at least as high as the tallest article to be conveyed on said conveyor to form an air dam so that substantially uniform higher than ambient air pressure is formed which moves as a stream above said conveyor, each of said sidewalls being tilted inwardly from bottom to top at a sufficient angle so that there is no sidewall attachment effect between the lower portion of said sidewalls and the sidewalls of the articles but there is a sidewall attachment effect between the upper portion of said sidewalls and the upper portion of the sidewall of the container due to air flowing therebetween to vertically stabilize the articles as they move from said upstream location to said downstream location.

2. Apparatus, as claimed in claim 1, further including:
   air supplying means along the lower edge of each sidewall for supplying air in sufficient volume to minimize movement of the bottom of the articles toward said sidewall of said conveyor.

3. Apparatus, as claimed in claim 2, wherein said air supplying means includes:
   a row of openings through said surface of larger size than said flotation jets.

4. Apparatus, as claimed in claim 1, wherein:
   said sidewalls are tilted at an angle of at least 3°.

5. A controlled speed single file coverless air conveyor for conveying articles, having widely varying diameters and heights, at constant speed, said conveyor comprising:

a conveying surface extending from an upstream location to a downstream location and having a width which is wider than the largest diameter article, first and second opposite side edges and an underside with a prearranged pattern of flotation air jets communicating said surface and said underside;

a plenum connectable to a source of air under pressure and attached to said underside of said conveyor; and an imperforate sidewall along each of said side edges to form an air dam so that a higher than ambient air pressure zone is formed therealong but is slightly reduced in pressure along the center of said conveyor which tends to center the articles along said conveyor, each of said sidewalls being tilted inwardly from bottom to top at a sufficient angle so that there is no sidewall attachment effect between the lower portion of said sidewalls and the sidewalls of the articles but there is a sidewall attachment effect between the upper portion of said sidewalls and the upper portion of the sidewall of the container due to air flowing therebetween to vertically stabilize the articles as they move from said upstream location to said downstream location.

6. Apparatus, as claimed in claim 5, wherein:
air supplying means along the lower edge of each sidewall for supplying air in sufficient volume to minimize movement of the bottom of the articles toward said sidewall of said conveyor.

7. Apparatus, as claimed in claim 6, wherein said air supplying means includes:
a row of openings through said surface of larger size than said flotation jets.

8. Apparatus, as claimed in claim 5, wherein:
said sidewalls are tilted at an angle of at least 3°.

9. A method of moving cylindrical articles along a coverless air conveyor en masse at uniform speed without jamming from an upstream location to a downstream location, said method comprising:

providing a conveyor surface with a predetermined pattern of flotation jets which are substantially perpendicular but have a very slight downstream angle;

directing air through the jets at sufficient volume to create a mass of air of higher than ambient air pressure above the conveyor to separate the articles from each other and move them downstream at a substantially constant velocity;

providing sidewalls along opposite sidewalls of the conveyor surface having a height at least as high as the tallest article being conveyed;

providing a volume of air along the sides of the conveyor surface adjacent the lower portion of the articles to serve as a cushion to minimize any tendency of the articles to come in contact with the sidewall and create a sidewall attachment effect;

bringing the upper portion of the articles into close proximity with the sidewalls;

passing air between the sidewall and the upper edge of the articles so as to create a sidewall attachment effect to vertically stabilize the articles as they are conveyed.

* * * * *